April 5, 1938.    G. V. CURTIS ET AL    2,113,441
UNIVERSAL JOINT
Filed June 9, 1937
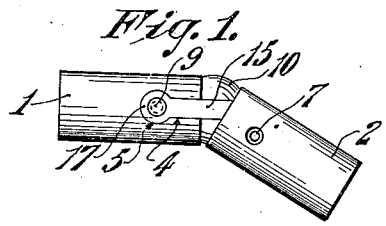
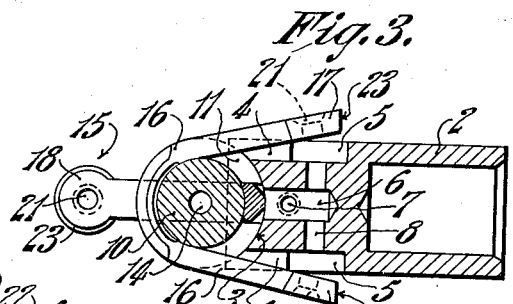
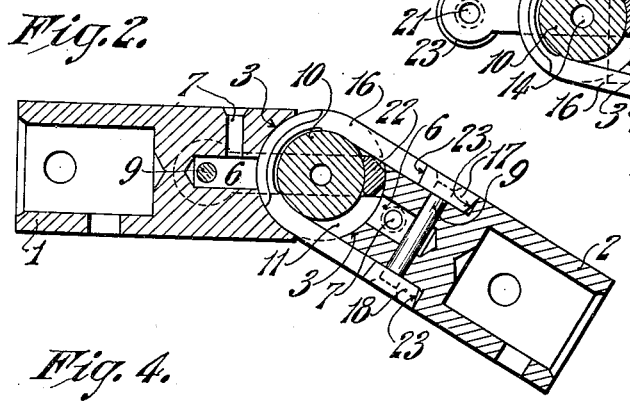
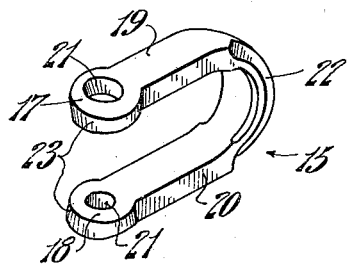
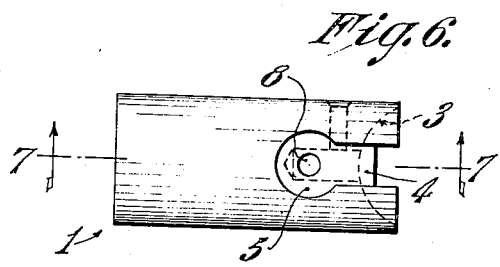
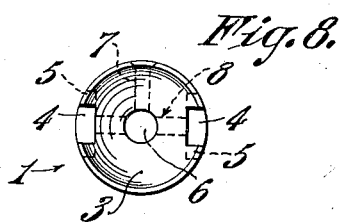
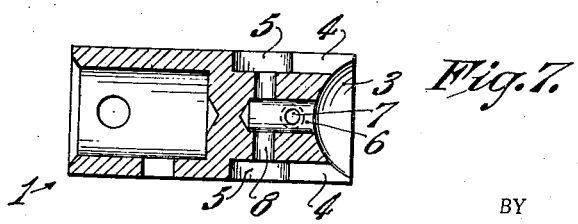
INVENTORS,
George V. Curtis,
Ralph E. Curtis,
BY
Blake Hewer, ATTORNEY.

Patented Apr. 5, 1938

2,113,441

UNITED STATES PATENT OFFICE 2,113,441

UNIVERSAL JOINT

George V. Curtis and Ralph E. Curtis, West Springfield, Mass.

Application June 9, 1937, Serial No. 147,304

4 Claims. (Cl. 64—16)

This invention relates to improvements in universal joints, and is particularly pertinent to universal joints of small sizes.

An object of this invention is to provide a universal joint including hub members, a ball, and yoke members for connecting the hub members and the ball, the yoke and hub members being provided with cooperating means for positively and solidly locking them together. It is customary in joints of this character to lock the yoke members to the hub members with rivet pins, and depend on the strength of the rivet pins to hold. In this invention, the yoke members and hub members are locked together independently of the rivet pins, in such a manner as to provide a much stronger construction.

A further object of this invention is to provide a universal joint in which the cooperating elements are so designed as to permit simple, quick, and efficient assembly, resulting in advanced economy in manufacturing and production costs.

A third object of this invention is to provide in a universal joint of the character described, oil wells adjacent to and communicating with the moving parts, and readily accessible ports for filling the oil wells or reservoirs.

These, and other objects and advantages of this invention will be more completely described and disclosed in the following specification, the accompanying drawing, and the appended claims.

Broadly, this invention comprises a universal joint construction including hub members formed with semispherical concave end surfaces and oppositely disposed longitudinal channels extending from said surfaces and terminating in circular sockets having a greater diameter than the width of the channels, a ball member formed with two annular channels perpendicularly disposed to each other, U-shaped yoke members engaged in the channels in the ball and hub members and provided with circular terminal portions for locking engagement in the circular sockets of the hub members, rivet pins securing the terminals of the yokes together and to the hub members, the hub members being provided with oil wells communicating with their concave end surfaces, and filling ports communicating with the wells.

A preferred embodiment of this invention is illustrated in the accompanying drawing, in which:—

Fig. 1 is an elevational view of our universal joint.

Fig. 2 is a longitudinal sectional view.

Fig. 3 is a view similar to Fig. 2, illustrating the method of assembly.

Fig. 4 is a perspective view of one of the yoke members.

Fig. 5 is an elevational view of the ball.

Fig. 6 is an elevational view of one of the hub members.

Fig. 7 is a sectional view, taken on the line 7—7 of Fig. 6, and

Fig. 8 is an end view of the hub illustrated in Fig. 6.

Referring now to the drawing in detail, in which like numerals refer to like parts throughout:—

Hub members 1 and 2 are identical, and are each formed with concave end surfaces 3, and oppositely positioned longitudinal channels 4 extending from the ends 3 and terminating in circular sockets 5, the sockets 5 being larger in diameter than the width of the channels 4. The hub members 1 and 2 are also provided with oil wells 6, axially disposed and communicating with the surfaces 3, and ports 7 are provided, extending from the wells 6 radially to the outer surface of the hub member, whereby the wells may be conveniently supplied with oil. A bore 8, centered in the sockets 5, is provided for receiving a rivet pin 9.

A ball 10 is formed with annular channels 11 and 12, perpendicularly disposed relative to each other, and, in the assembled joint, the concave surfaces 3 of the hub members 1 and 2 are engaged on the surface 13 of the ball 10. A bore 14 is provided in the ball 10 to assist in lubrication.

Yoke members 15 and 16, which are identical, are U-shape in form, having a rectangular cross section to fit the channels 4 in the hub members 1 and 2 and the channels 11 and 12 in the ball 10. The yokes 15 and 16 are formed with circular terminal portions 17 and 18 which are larger in diameter than the arm portions 19 and 20, and these circular terminal portions 17 and 18 are bored and countersunk at 21 to receive the rivet pins 9. The back portion 22 of the yokes 15 and 16 is chamfered to provide clearance when the hubs 1 and 2 are arranged at an angle, as indicated in Fig. 2.

In assembling the universal joint, the U-shaped yokes 15 and 16 are first placed in the channels 11 and 12 of the ball 10, with the arms 19 and 20 of the yokes slightly spread, as indicated in Fig. 3. A hub 2 is then positioned with its concave surface 3 against the ball 10 and its channels 4 beneath the arms 19 and 20 of the yoke 16. The arms 19 and 20 are then forced inwardly until engaged in the channels 4, with their terminal portions 17 and 18 engaged in the sockets 5 of the hub 2. The cooperating hub 1 is assembled in the same manner. In order to facilitate entrance of the terminal portions 17 and 18 in the sockets 5, these terminal portions may be slightly tapered, as indicated at 23. After the yokes are properly assembled in the hub members, rivet pins 9 are inserted in the bores 8 and 21 and headed over, as indicated at Fig. 2.

The construction disclosed is very strong and durable, in proportion to the size of the universal joint and the torsional strains involved. The terminal portions 17 and 18 engaged in the sockets 5 provide a positive lock whereby the yokes are locked into the hubs independently of the rivet pins, thus relieving the rivet pins of any shearing stresses. The oil wells 6 communicate directly with the channels 11 and 12 of the ball 10, thus providing ample lubrication for the surfaces of the ball and hubs and for the yokes engaged in the channels of the ball. The convenience of lubrication provided by the ports 7 communicating with the wells 6 is also a feature of this invention.

From the foregoing description, it will be readily understood by those skilled in the art, that we have provided a new construction for universal joints of small sizes which is simple and economical of manufacture and assembly, extremely strong and durable in use, and provided with simple and efficient lubricating means.

What we claim is:—

1. A universal joint comprising, in combination, two hub members, each provided with a concave end surface and oppositely disposed longitudinal channels communicating with said end surface and terminating in circular sockets of greater diameter than the width of said channels, a ball provided with two annular channels perpendicular to each other, U-shaped yokes engaged in the channels in said ball and said hub members, said yokes being formed with circular terminal portions engaged in the sockets in said hub members.

2. In combination, in a universal joint, hub members formed with concave end surfaces, a ball formed with annular channels and engaging said concave surfaces, each of said hub members being formed with longitudinal, oppositely positioned channels communicating at one end with said concave end surface and at the opposite end with a circular socket of the same depth as the channel but of a greater diameter than the width of the channel, yoke members engaged in the channels in said ball and said hub members and provided with enlarged circular end portions engaged in said circular sockets.

3. A universal joint construction comprising, in combination, two identical hub members, each formed with a concave end surface and provided with an oil well axially disposed therein and communicating with said concave end surface and a radial oil port communicating with said oil well, said hub members being also formed with oppositely positioned longitudinal channels in the outer surfaces thereof and extending from said concave end surfaces and terminating in circular sockets of greater diameter than the width of said channels, a ball member formed with annular channels at right angles, said annular channels communicating with said oil wells, U-shaped yoke members engaged in said channels in said ball and hub members, said yoke members being provided with circular terminal portions engaged in said circular sockets, rivet pins securing the circular terminal portions of each of said yokes in said hub members.

4. A hub member for universal joints comprising a cylindrical body provided with a semispherical concave end and formed with oppositely disposed longitudinal channels in its outer surface, said channels communicating at one end with said concave end and terminating at the opposite end in circular sockets formed in said body portion, said circular sockets being greater in diameter than the width of said channels, said body portion being also formed with an axial oil well and an oil port leading from said well to the outer surface of said portion.

GEO. V. CURTIS.
RALPH E. CURTIS.